United States Patent
Le Barz et al.

(10) Patent No.: US 8,447,034 B2
(45) Date of Patent: *May 21, 2013

(54) METHOD AND SYSTEM MAKING IT POSSIBLE TO PROTECT AFTER COMPRESSION THE CONFIDENTIALITY OF THE DATA OF A VIDEO STREAM DURING ITS TRANSMISSION

(75) Inventors: Cédric Le Barz, Limours en Hurepoix (FR); Marc Leny, Nanterre (FR); Erwann Renan, Paris (FR)

(73) Assignee: Thales, Neuilly sur Seine (FR)

( * ) Notice: Subject to any disclaimer, the term of this patent is extended or adjusted under 35 U.S.C. 154(b) by 173 days.

This patent is subject to a terminal disclaimer.

(21) Appl. No.: 12/996,347

(22) PCT Filed: Jun. 3, 2009

(86) PCT No.: PCT/EP2009/056831
§ 371 (c)(1),
(2), (4) Date: Apr. 21, 2011

(87) PCT Pub. No.: WO2009/147184
PCT Pub. Date: Dec. 10, 2009

(65) Prior Publication Data
US 2011/0194688 A1    Aug. 11, 2011

(30) Foreign Application Priority Data
Jun. 3, 2008 (FR) ..................... 08 03061

(51) Int. Cl.
*H04N 7/167* (2011.01)
(52) U.S. Cl.
USPC .......... 380/217; 713/189; 713/190; 713/191; 713/192; 713/193
(58) Field of Classification Search
USPC ....................................... 380/217
See application file for complete search history.

(56) References Cited

U.S. PATENT DOCUMENTS

| | | | | |
|---|---|---|---|---|
| 6,505,299 | B1 * | 1/2003 | Zeng et al. | 713/160 |
| 2005/0207569 | A1 * | 9/2005 | Zhang et al. | 380/28 |
| 2006/0188013 | A1 | 8/2006 | Coimbra et al. | |

FOREIGN PATENT DOCUMENTS

| WO | 2006/067172 A1 | 6/2006 |
|---|---|---|
| WO | 2007/052142 A2 | 5/2007 |

OTHER PUBLICATIONS

Marc Leny et al.: "Statistical motion vector analysis for object tracking in compressed video streams," SPIE, Electronic Imaging, vol. 6812, San Jose, 2008.

(Continued)

*Primary Examiner* — Longbit Chai
(74) *Attorney, Agent, or Firm* — Baker Hostetler LLP

(57) ABSTRACT

A method is provided for visually encrypting at least one part of an at least partially compressed video stream or video sequence, it being possible for said stream to be decomposed into a first type of objects and a second type of objects, the method being applied on each of the images contained in a video sequence, including at least the following steps:
- analyzing the sequence in the compressed domain so as to define for a given image N at least one first group of objects to be protected by visual encryption and a second group of objects, the transformed coefficients and the motion estimation vectors being transmitted directly to step d) of compression,
- predicting on the basis of the data arising from the analysis in the previous step of the compressed image N, the position of the objects for a following image N+1,
- determining the splitting into slices or into groups of slices of the image N+1,
- compressing the first group of objects of the image N+1 and ciphering at least one part thereof,
- transmitting the other types of groups of objects for the image N+1 to a compression step.

9 Claims, 3 Drawing Sheets

OTHER PUBLICATIONS

Marc Leny et al.: "De l'estimation de mouvement pour l'analyse temps reel de videos dans le domaine compresse," [Motion estimation for the real-time analysis of videos in the compressed domain], GRETSI, 2007.

Yeongyun Kim, et al, "A Selective Video Encryption for the Region of Interest in Scalable Video Coding", Telcon 2007—2007 EEEE Region 10 Conference, Oct. 30, 2007, pp. 1-4, IEEE, XP031226281.

Frederic Dufaux, et al., "Smart Video Surveillance System Preserving Privacy", Proceedings of the SPIE, Mar. 1, 2005, pp. 54-63, vol. 5685, XP002430633.

Cyril Bergeron et al.: "Compliant selective encryption for H.264/AVC video streams," Proceedings of the International Workshop on Multimedia Processing, 4 pages, MMMP'05, Shanghai.

* cited by examiner

METHOD AND SYSTEM MAKING IT POSSIBLE TO PROTECT AFTER COMPRESSION THE CONFIDENTIALITY OF THE DATA OF A VIDEO STREAM DURING ITS TRANSMISSION

CROSS-REFERENCE TO RELATED APPLICATIONS

This application is a National Stage of International patent application PCT/EP2009/056831, filed on Jun. 3, 2009, which claims priority to foreign French patent application No. FR 0803061, filed on Jun. 3, 2008, the disclosures of which are incorporated by reference in their entirety.

FIELD OF THE INVENTION

The invention relates to a method and a system making it possible to transmit an at least partially compressed video stream while ensuring the security of the information to be transmitted. For this purpose, the method integrates a step of ciphering selected areas in a given image of the stream.

The invention is applied for transmitting compressed video streams in a transmission context subject to surveillance and for avoiding any access to the content of certain protected areas of the image. Thus, any malicious viewing of the stream may be avoided. It in fact makes it possible to protect people's privacy for example in locations equipped with video surveillance.

Hereinafter in the document, the term "foreground plane" designates the mobile object or objects in a video sequence, for example, a pedestrian, a vehicle, a molecule in medical imaging. On the contrary, the designation "background plane" is used with reference to the environment as well as to the fixed objects. This comprises, for example, the ground, buildings, trees which are not perfectly stationary or else parked cars.

The invention can, inter alia, be applied in applications implementing the standard defined in common by the ISO MPEG and the video coding group of the ITU-T termed H.264 or MPEG-4 AVC (advanced video coding) which is a video standard providing a more effective compression than the previous video standards while exhibiting a complexity of implementation which is reasonable and oriented toward network applications.

In the subsequent description, the Applicant uses the expression stream undergoing compression or video sequence undergoing compression to designate one and the same object, namely: undergoing compression signifies that the current image has not been compressed when the steps culminating in the ciphering of the objects to be protected are executed, but that the previous images have already been compressed.

The words ciphering or encryption are used to designate the same transformation.

The expression portion or "slice" correspond to a sub-part of the image consisting of macroblocks which belong to one and the same set defined by the user.

BACKGROUND

Currently, video surveillance is being used more and more, raising notably the problem of respect for privacy. In certain applications, only images or areas of images of a video stream must be able to be accessible, accessibility being reserved for authorized persons.

The publication entitled *Compliant Selective encryption for H.264/AVC video streams* by Cyril Bergeron and Catherine Lamy, Proceedings of the International Workshop on Multimedia Processing, MMSP'05, Shanghai, discloses a scheme making it possible to partially encipher a video stream so as to secure the transmission of the information contained in this stream while preserving compatibility with the H.264 standard.

SUMMARY OF THE INVENTION

One of the objects of the present invention is to offer a method for protecting the content of images or of certain areas of an image so as to preserve the confidentiality of the data. This is, in this exemplary implementation, executed during the step of compressing a data stream.

The invention relates to a method for protecting at least part of an at least partially compressed video stream or video sequence against a violation of the information contained in said stream, it being possible for said stream to be decomposed into several types of objects, the method being applied on each of the images contained in a video sequence, characterized in that it comprises at least the following steps:

a) analyzing the video sequence in the compressed domain so as to define for a given image N at least one or more groups of objects to be protected by ciphering, designated first group of objects, a second group of objects then being associated with the remainder of the image, the transformed coefficients and the motion estimation vectors being transmitted directly to step d) of compression, b) predicting, on the basis of the data arising from the analysis in step a) of the compressed image N, the position of the objects for a following image N+1, c) determining the splitting into slices or into groups of slices of the image N+1, d) compressing the parts of the image comprising the group or groups of slices of the image N+1 that are linked with the first group and encrypting at least part of the first group or groups of objects of the image N+1, e) compressing the other types of groups of objects for the image N+1, f) adding to the groups of objects of the image N+1 which arise from steps d) and e) information identifying the groups of objects or not encrypted.

The method can add to the streams arising from steps d) and e) information, identifying the groups of objects encrypted or not. For H.264 for example, for a given image or a given group of images, will be added a network transport unit of undefined "NAL" type (described in the H.264 standard by the term "undefined NAL"), which will convey an item of information indicating which slices (slices) are the ones that have been encrypted.

The step of predicting the position of an object comprises, for example, the following steps:

using, on the one hand, the results of the analysis in the compressed domain leading to identified blocks within an image and also the stream undergoing compression, carrying out the tracking on the basis of these identified blocks by pairing and prediction by using the historical log of the positions of the objects on the previous N images.

The pairing step will be able to rely on a Munkres algorithm, and the tracking step on a Kalman filter.

The method implements for the ciphering step a selection of the bits allowing decoding with a normal decoder, for example, according to the aforementioned article authored by Cyril Bergeron and Catherine Lamy.

Since the video sequence is produced, for example, via the MPEG-4 part 10/H.264 standard, the method for defining the slices or "slices groups" uses, for example, the technique of flexible scheduling of macroblocks or FMO (Flexible Macroblock Ordering) permitting the definition of the groups of slices or "slices groups" macroblock by macroblock.

The method can associate either a group of slices or "slices group" per object to be protected or mobile object, or a slices group to the whole set of mobile objects (a second then being allotted to the background plane).

The image-by-image "updating" of the slices group is accompanied, for example, by the transmission of a PPS (Picture Parameters Set) parameter which indicates to the decoder the new splitting of the image.

The subject of the invention is also a system making it possible to visually encrypt at least part of an at least partially compressed video stream or video sequence against unauthorized viewing of the information contained in said stream, characterized in that it comprises at least: a video part for the transmission of a stream of images undergoing compression, a video coder, a module for selecting the stream to be encrypted or ciphered and a suitable encryption or ciphering module for implementing the steps of the method comprising the aforementioned characteristics and a module for transmitting the at least partially ciphered or encrypted stream.

BRIEF DESCRIPTION OF THE DRAWINGS

Other characteristics and advantages of the device according to the invention will be more apparent on reading the description which follows of an exemplary embodiment given by way of wholly nonlimiting illustration, together with the figures which represent.

DETAILED DESCRIPTION

In order to better elucidate the manner of operation of the method according to the invention, the description includes a reminder regarding the way to perform an analysis in the compressed domain, such as it is described, for example, in US patent application 2006 188013 with reference to FIGS. 1, 2, 3 and 4 and also in the following two references:

Leny, Nicholson, Prêteux, "De l'estimation de mouvement pour l'analyse temps réel de vidéos dans le domaine compressé" [Motion estimation for the real-time analysis of videos in the compressed domain], GRETSI, 2007.

Leny, Prêteux, Nicholson, "Statistical motion vector analysis for object tracking in compressed video streams", SPIE Electronic Imaging, San Jose, 2008.

In summary certain techniques used in the MPEG standards and set out in these articles consist in dividing the video compression into two steps. The first step is aimed at compressing a still image. The image is first of all divided into blocks of pixels (of 4×4 or 8×8 depending on the MPEG-1/2/4 standards), which undergo, subsequently, a transform allowing a switch to the frequency domain, and then a quantization makes it possible to approximate or to delete the high frequencies to which the eye is less sensitive. Finally the quantized data are entropically coded. For this purpose, it makes it possible to delete or attenuate the high frequencies that are less sensitive to the eye and thus to reduce the quantity of information. The objective of the second step is notably to reduce the temporal redundancy. For this purpose, it makes it possible to predict an image on the basis of one or more other image(s) previously decoded within the same sequence (motion prediction). For this purpose, the process searches through these reference images for the block which best corresponds to the desired prediction. Only a vector (Motion Estimation Vector, also known simply as the Motion Vector), corresponding to the movement of the block between the two images, as well as a residual error making it possible to refine the visual rendition are preserved.

Figure 1:
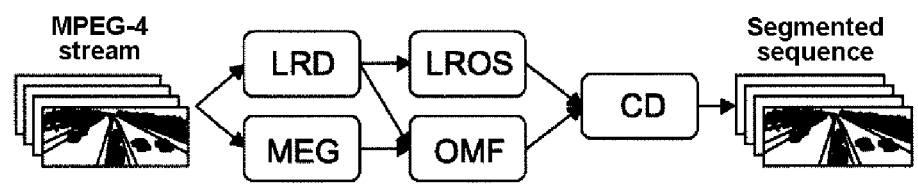
FIGS. 1 to 4, the results obtained by an analysis in the compressed domain, FIG. 5, an exemplary method according to the invention applied to a video stream undergoing compression, FIG. 6 an exemplary diagram for a video coder suitable for implementing the ciphering method according to the invention.

These vectors do not necessarily correspond however to a real motion of an object in the video sequence but can be likened to noise. Various steps are therefore necessary in order to use this information to identify the mobile objects. The works described in the aforementioned publication of Leny et al, "De l'estimation de mouvement pour l'analyse temps réel de vidéos dans le domaine compressé", and in the aforementioned US patent application have made it possible to delimit five functions rendering the analysis in the compressed domain possible, these functions and the modules implementing them are represented in FIG. 1:

1) a Low Resolution Decoder (LRD) makes it possible to reconstruct the entirety of a sequence at the resolution of the block, deleting on this scale the motion prediction;
2) a Motion Estimation Vectors Generator (MEG) determines, for its part, vectors for the set of the blocks that the coder has coded in "Intra" mode (within Intra or predicted images);
3) a Low Resolution Object Segmentation (LROS) module relies, for its part, on an estimation of the background in the compressed domain by virtue of the sequences reconstructed by the LRD and therefore gives a first estimation of the mobile objects;
4) motion-based filtering of objects (OMF—Object Motion Filtering) uses the vectors output by the MEG to determine the mobile areas on the basis of the motion estimation;
5) finally a module making it possible to establish a Cooperative Decision (CD) on the basis of these two segmentations, takes into account the specifics of each module depending on the type of image analyzed (Intra or predicted).

The main benefit of analysis in the compressed domain pertains to calculation times and memory requirements which are considerably reduced with respect to conventional analysis tools. By relying on the work performed during video compression, analysis times are today from 10-fold to 20-fold the real time (250 to 500 images processed per second) for 720×576 4:2:0 images.

One of the drawbacks of analysis in the compressed domain such as described in the aforementioned documents is that the work is performed on the equivalent of low resolution images by manipulating blocks composed of groups of pixels. It follows from this that the image is analyzed with less precision than by implementing the usual algorithms used in the uncompressed domain. Moreover, objects that are too small with respect to the splitting into blocks may go unnoticed.

Figure 2:
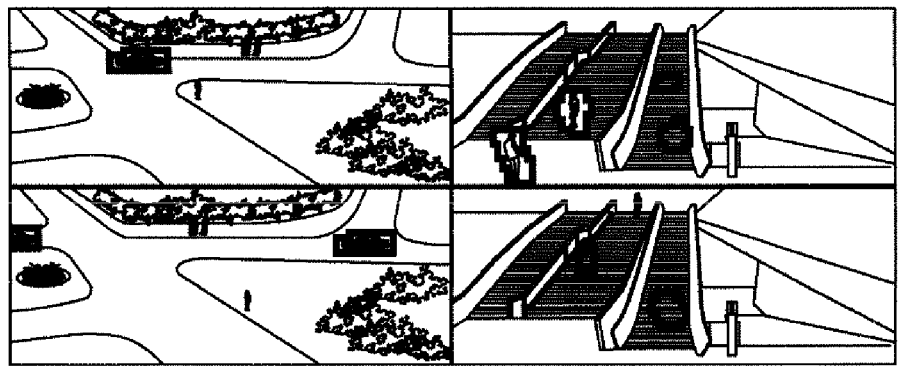
Figure 3:
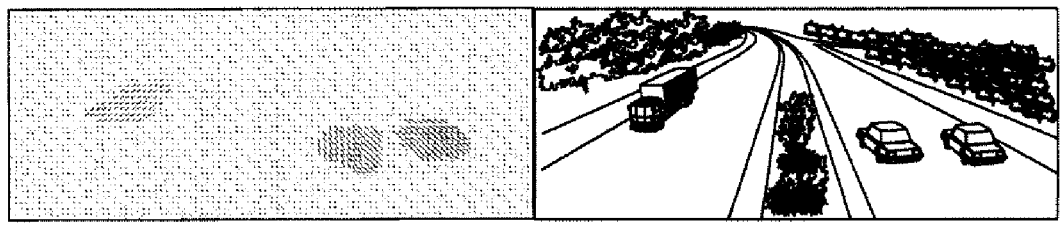
Figure 4:
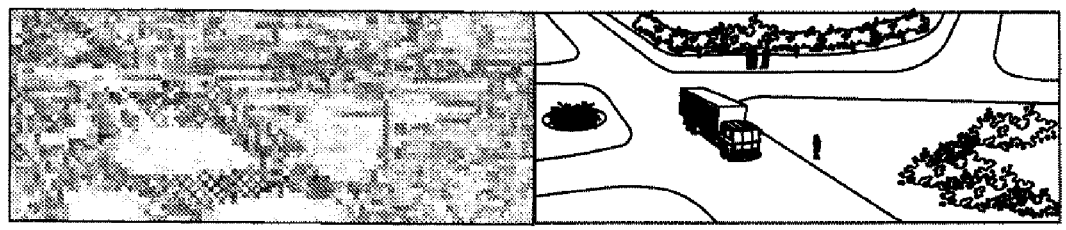

The results obtained by analysis in the compressed domain are illustrated by FIG. 2 which show the identification of areas containing mobile objects. FIG. 3 shows diagrammatically the extraction of specific data such as the motion estimation vectors and FIG. 4 low resolution confidence maps obtained corresponding to the contours of the image.

Figure 5:
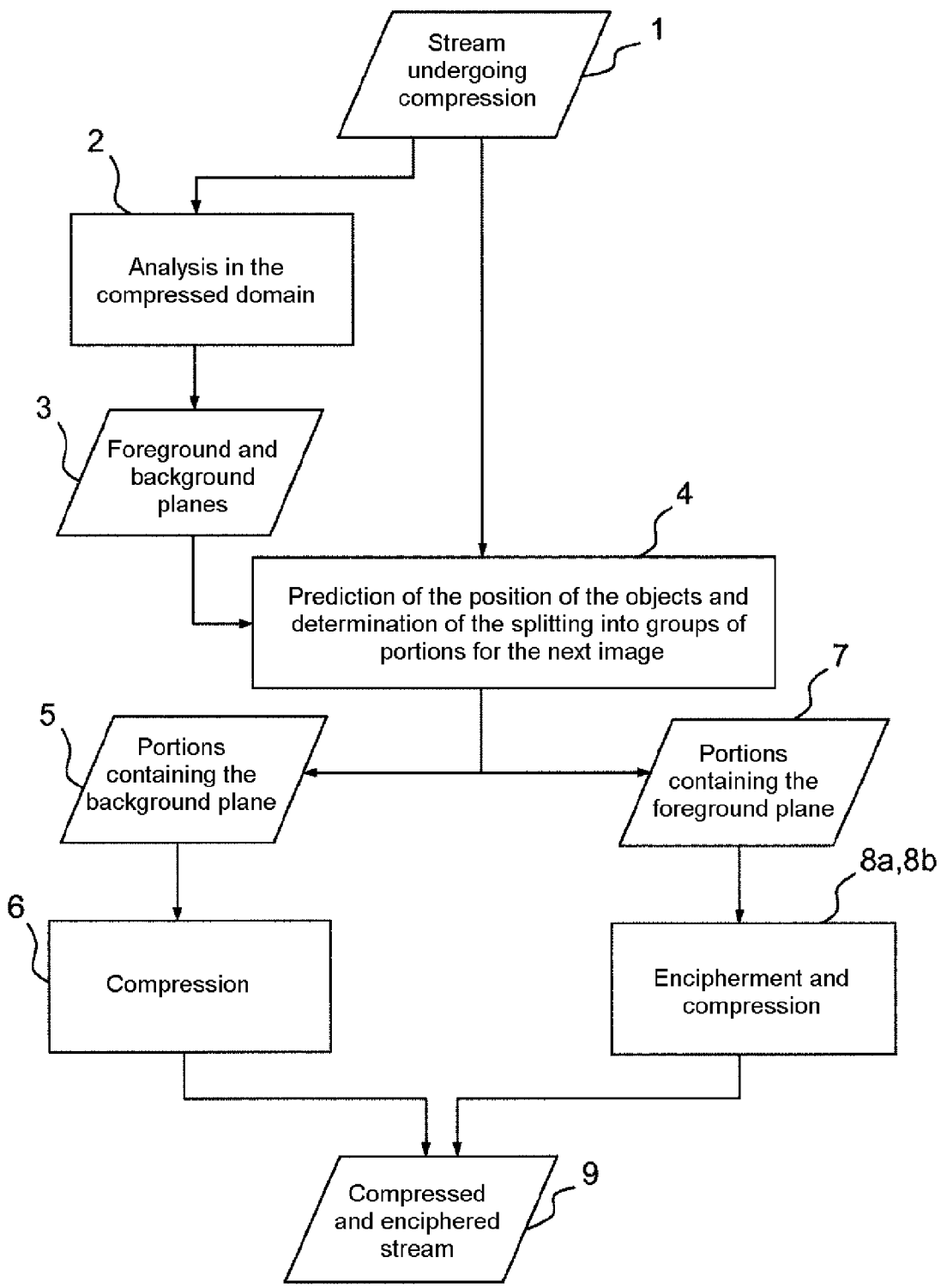
Figure 6:
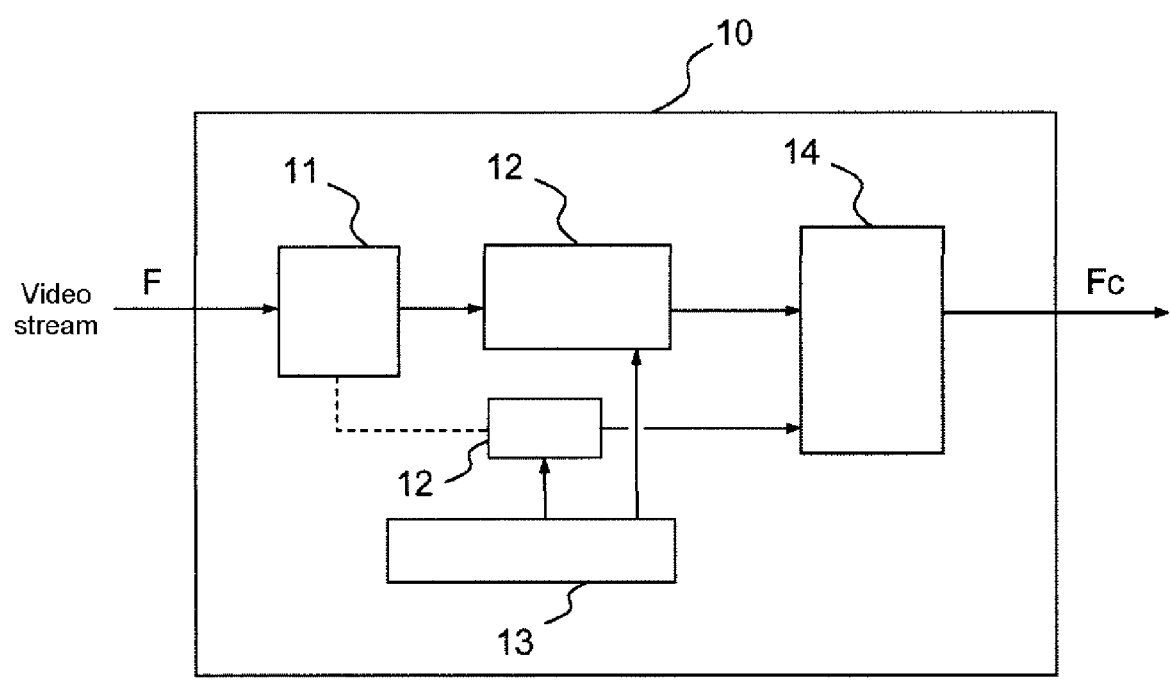

FIG. 5 shows diagrammatically an exemplary implementation of the method according to the invention, in the course of which areas of an image undergoing compression, that is to say during the compression step, will be encrypted or ciphered This encryption step will be executed during the compression step implemented within a video sender comprising at least one video coder and one processing unit, as is shown diagrammatically in FIG. 6. Certain areas of the image having more importance in the stream, in the sense of confidentiality, will be chosen to be protected against undesired uses. The example given by way of illustration comprises two areas, but there is nothing to prevent a user from applying the method to several areas which will each have an associated degree of confidentiality, therefore different encryption keys suited to the confidentiality level.

The method and the system according to the invention implement the analysis in the compressed domain coupled with a tracking of objects. This comprises making the link between the objects segmented independently over each image so as to obtain one single object tracked in the course of the sequence. For example, without "object tracking", if an object is present and segmented over 25 images, then the method will have to independently process 25 objects, and this may introduce multiple problems of merging of tracks or of indexation for example.

The analysis of video sequences in the compressed domain exhibits, for its part, the benefit of using a part of the work performed by the video coder by utilizing the information available in the compressed domain.

The method according to the invention will consider the images one after another. It will select areas that are present in an image and that must be protected by ciphering and apply the method to these areas.

The stream 1 undergoing compression within a coder is transmitted to a first analysis step 2. This step is executed image by image; on the other hand, just like the method, it may be implemented solely on certain images which will, for example, be determined and selected upstream of the method (output frequency lower than that of the stream before compression, selection of certain images depending on their type, etc.). The function of the first step implemented in the course of the method is notably to extract the data representative of an image which has been compressed. For a compressed image, the method has, on completion of the first step, for example, a sequence of masks comprising blobs (regions having received the same label) linked with the mobile objects 3 or foreground plane in certain cases. The objective of the mask is to separate in a compressed image the areas corresponding to the mobile objects from the other areas which are quasi-stationary, or background plane. The mask used may be a binary mask. By convention in this case, it is allotted the digit "1" to designate foreground objects and the digit "0" to designate the background. Any other convention may be used without departing from the scope of the invention.

The image-by-image "updating" of the slices group is accompanied, for example, by the transmission of a PPS (Picture Parameters Set) parameter which indicates to the decoder the new splitting of the image.

Three apparently independent steps constitute the present invention: compression, analysis and encryption. Specifically, these various modules can communicate with one another to optimize the whole of the processing chain:

On the one hand, the compression used immediately by the analysis in the compressed domain does not culminate directly in the video stream such as it will be stored or transmitted. The transforms in the frequency domain are calculated, as well as the motion compensation, but the entropy coding and the encapsulation of the stream will take place only after analysis and encryption. By proceeding thus, the information arising from the compression is directly usable by the analysis module without passing through a superfluous step of shaping the data (or parsing). The transformed coefficients and the motion estimation vectors are transmitted directly from the first to the second module.

The analysis module which defines the splitting of the following image returns these parameters to the compression brick.

For the encryption part properly speaking, once again the transformed coefficients and motion estimation vectors are necessary. The proposed method makes it possible here also to circumvent the de-encapsulation and entropy decoding step since the information travels from module to module.

Once these three steps have been processed, only then do the entropy coding (which may specifically begin during encryption) and the encapsulation of the stream take place.

The invention therefore allows more than a simple juxtaposition of functions that process a video stream in series: feedback loops are possible and all the redundant steps between the modules involved are now present only once.

Instead of masks, the method according to the invention can also consider the bounding boxes around the mobile objects. The coordinates of bounding boxes correspond to the mobile objects and are calculated with the aid of the mask. These boxes may be defined by virtue of two extreme points or else by a central point associated with the dimensions of the box. It is possible in this case to have a set of coordinates per image or one set for the whole of a sequence with the trajectory information (date and point of entry, curve described, date and point of exit). This scheme known to the person skilled in the art will not be expounded upon.

The analysis in the compressed domain may be performed by implementing the method described in the aforementioned US patent application. However, any method making it possible to obtain an output of the analysis step taking the form of masks per image, will also be able to be implemented for the step of analysis in the compressed domain.

Subsequent to this first step, a tracking step will be implemented. This tracking step may be carried out on the basis of these blobs identified by pairing, applying for example the Munkres algorithm, and then by position prediction, for example by Kalman filter, using the historical log of the position of the objects over the previous N images on the basis of the data arising from the analysis of the compressed image N, as well as results obtained in an equivalent manner on the x previous images; N−x to N. It is then possible to forecast the position of the objects of the foreground plane in the next image 4*a*. This next image N+1 has not yet been compressed; it is therefore still possible to determine the suitable splitting into groups of slices, better known by the name "slice group", this corresponding to step 4*b*.

The analysis followed by the tracking step have made it possible to forecast, for the image to be compressed, areas containing the mobile objects and others belonging to the background. The method will then define two types of "groups of slices" 5, 7 for the image. The first 5 will correspond to the background areas, which do not require any visual cryptography. The second 7 will be dedicated to the mobile objects, that the ciphering or encryption step will target. Two alternatives then offer themselves: declare all the mobile objects in a unique "SG", or define one SG per mobile object. Within the framework of the current standards, the latter option is more suitable in precise cases, for example when few objects are liable to appear simultaneously in the field of the camera. Indeed the number of SGs limited to 8 (even for the extended profile of H.264) implies a maximum of 7 possible mobile objects in an image (the last "slices group" being dedicated to the background).

In the case of H.264, this image-by-image "updating" of the "slices group" is accompanied by the transmission of a parameter better known by the abbreviation PPS (Picture Parameters Set) which indicates to the decoder receiving the stream the new splitting of the image. By virtue of this splitting into "slices", the coder carries out a bridled motion estimation for the current group of "slices". Thus, the motion estimation vectors will not point toward blocks of another group of slices or "slices group", thereby allowing two independent reconstructions of the foreground and of the background plane The usual result is therefore, in this exemplary implementation, a video sequence comprising for each image at least two slices groups, one containing the background plane and the others the whole set of mobile objects, with independent predictions between each slices group.

The protection to accessibility of the information contained in the image can then be performed by targeting the "slices groups" comprising the foreground plane. The "slices group" comprising the background plane will be transmitted directly to a compression step 6. The "slices group (or groups)" comprising the mobile objects will be for their part compressed initially 8b and then encrypted 8a. It is also possible to associate different security levels with the independent mobile objects, and as a function of these levels to adapt the ciphering step (number of modified bits, different keys, etc.).

The two outputs of steps 6 and 8a then form a single compressed and partially encrypted stream Fc to which an NAL of undefined type, of type 30 and 31, inside which outputs it is possible to transmit any type of information, has been added to indicate the "slices" which have been encrypted. In contradistinction to the other types of NAL, the NALs 30 and 31 are not reserved for the stream in itself or for the RTP-RTSP type network protocols. A normal decoder will merely put aside this information whereas a specific decoder, developed to take these NALs into account, will be able to choose to use this information to decrypt the encrypted slices ("slices").

The first step having made it possible to target the mobile objects during ciphering, the use of a normal decoder will produce a sequence in which the foreground plane will be visually encrypted with a normal background plane, whereas, in the case of a decoder using the encryption or ciphering key and the information identifying the of the encrypted stream, the images will be fully intelligible, readable.

The ciphering step can use the technique described in patent application WO 2006/067172 making it possible to modify the bits in the image which will allow decoding with a normal decoder (without decryption) or with a decoder using the ciphering or encryption key.

FIG. 6 is a block diagram of an exemplary system according to the invention comprising a video coder suitable for executing the steps described in FIG. 5.

In the figure is represented only the video sender part 10 for the transmission of a stream of images undergoing compression. The sender comprises a video coder 11 suitable for analyzing, according to the steps described in FIG. 5, the various areas belonging to the foreground plane and other areas belonging to the background plane of a video image, for defining the slices groups for the next image and compressing the latter. The module 13 determines within the stream the "slices groups" that one or more modules 12 will protect at the confidentiality level by ciphering or encryption before the transmission module 14 broadcasts it.

Without departing from the scope of the invention, ciphering or encryption techniques other than those detailed in the present description, making it possible to encipher areas in an image so as to ensure the confidentiality of the information that they contain, may be used.

This visual encryption operation can also be performed in parallel with an order of target throughput of the mobile objects in the sequence. It will then be possible to add robustness to errors (which increases the throughputs) coupled with an adaptation to a target throughput by optimization during compression or on the fly on the already compressed stream. This coupling will make it possible for example to maintain a fixed throughput while protecting the content linked with the foreground plane.

The method and the system according to the invention exhibit notably the following advantages: using analysis in the compressed domain makes it possible to determine the areas that a user wishes to protect by visual cryptography.

The proposed parametrization of the "slices groups" makes it possible to adhere as closely as possible to the shape of the mobile objects at a block resolution. This makes it possible within the framework of video surveillance to transmit the ciphered stream, for example, to a guard post where security agents will be able to identify the presence of a person, car, truck, etc. distinctly through a silhouette without being able to directly identify the person's face or the vehicle's licence plate. This characteristic permits wider broadcasting of the surveillance streams while adhering to the constraints linked with respect for privacy.

The invention claimed is:

1. A method for protecting at least part of an at least partially compressed video stream against a violation of the information contained in said video stream, images of said video stream capable of being decomposed into a first type of objects and a second type of objects, the method being applied on each of the images contained in the video stream, comprising at least the following steps:
   a) analyzing the video stream in a compressed domain to define, for a given image N, at least one or more groups of objects to be protected by ciphering, and designating a first group of objects and a second group of objects, the analysis in the compression domain generating transformed coefficients and motion estimation vectors;
   b) subsequent to step a), tracking, using a historical log of the position of the one or more groups of objects over a previous predetermined number of images based on the analysis data, the position of mobile objects of a foreground plane in a next image N+1 that has not yet been compressed, and splitting the next image N+1 into groups of slices, by:
      predicting, for the next image N+1 to be compressed, areas containing the mobile objects and other areas belonging to a background plane,
      defining a first group of slices corresponding to the areas belonging to the background plane and a second group of slices corresponding to the mobile objects, wherein the first group of slices do not require any visual cryptography and at least part of the second group of slices will be encrypted;

c) compressing the areas of the next image N+1 comprising the second group of slices corresponding with the foreground plane and then encrypting at least part of the second group of slices;
d) compressing the first group of slices for the next image N+1; and
e) adding, to the first group of objects and the second group of objects of the next image N+1, information identifying whether the groups of objects are encrypted or not encrypted, wherein the added information indicates which objects have been encrypted, and wherein at least one processor performs the functions of steps a), b), c), d), and e).

2. The method as claimed in claim 1, wherein step b) implements a Munkres algorithm.

3. The method as claimed in claim 1, wherein step b) implements a Kalman filter.

4. The method as claimed in claim 1, encrypting the at least part of the second group of slices comprises selecting bits in an image that enable decoding with a normal decoder.

5. The method as claimed in claim 1, wherein the video stream is produced by an MPEG-4 part 10/H.264 standard, and defining the first group of slices and the second group of slices comprises using a flexible scheduling or Flexible Macroblock Ordering technique to define the groups of slices macroblock by macroblock.

6. The method as claimed in claim 5, wherein each group of slices is associated with one of the mobile objects.

7. The method as claimed in claim 6, further comprising transmitting a Picture Parameters Set parameter that indicates to a decoder, a new splitting of an image.

8. The method as claimed in claim 6, further comprising transmitting a network transport unit of undefined NAL type that indicates whether a slice group has been encrypted or not encrypted.

9. A system for visually encrypting at least part of an at least partially compressed video stream, comprising at least the following elements:
  a video part for the transmission of a stream of images undergoing compression,
  a video coder,
  a module for selecting a stream to be encrypted,
  an encryption module comprising at least one processor configured to perform the functions of the steps:
  a) analyzing the video stream in a compressed domain to define, for a given image N, at least one or more groups of objects to be protected by ciphering, and designating a first group of objects and a second group of objects, the analysis in the compression domain generating transformed coefficients and motion estimation vectors;
  b) subsequent to step a), tracking, using a historical log of the position of the one or more groups of objects over a previous predetermined number of images based on the analysis data, the position of mobile objects of a foreground plane in a next image N+1 that has not yet been compressed, and splitting the next image N+1 into groups of slices, by:
    predicting, for the next image N+1 to be compressed, areas containing the mobile objects and other areas belonging to a background plane,
    defining a first group of slices corresponding to the areas belonging to the background plane and a second group of slices corresponding to the mobile objects, wherein the first group of slices do not require any visual cryptography and at least part of the second group of slices will be encrypted;
  c) compressing the areas of the next image N+1 comprising the second group of slices corresponding with the foreground plane and then encrypting at least part of the second group of slices;
  d) compressing the first group of slices for the next image N+1; and
  e) adding, to the first group of objects and the second group of objects of the next image N+1, information identifying whether the groups of objects are encrypted or not encrypted, wherein the added information indicates which objects have been encrypted, and
  a module for transmitting the at least partially encrypted stream.

* * * * *